(12) United States Patent
Wiley et al.

(10) Patent No.: US 9,500,220 B2
(45) Date of Patent: Nov. 22, 2016

(54) BONDING WASHER

(71) Applicant: Hubbell Incorporated, Shelton, CT (US)

(72) Inventors: Brian Thomas Wiley, Shokan, NY (US); Palvin Chee Leong Chan, Saugerties, NY (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 14/723,039

(22) Filed: May 27, 2015

(65) Prior Publication Data

US 2015/0267736 A1 Sep. 24, 2015

Related U.S. Application Data

(63) Continuation of application No. 14/084,405, filed on Nov. 19, 2013, now Pat. No. 9,074,616, which is a continuation of application No. 13/619,032, filed on Sep. 14, 2012, now Pat. No. 8,608,418, which is a continuation of application No. 13/324,688, filed on Dec. 13, 2011, now Pat. No. 8,353,650, which is a continuation of application No. 11/308,683, filed on Apr. 21, 2006, now Pat. No. 8,092,129.

(51) Int. Cl.
*F16B 39/24* (2006.01)
*F16B 43/00* (2006.01)
*F16B 7/18* (2006.01)
*F16B 19/10* (2006.01)

(52) U.S. Cl.
CPC ............... *F16B 43/00* (2013.01); *F16B 7/187* (2013.01); *F16B 19/1054* (2013.01); *F16B 19/1072* (2013.01); *F16B 39/24* (2013.01)

(58) Field of Classification Search
CPC ................................ F16B 43/00; F16B 39/24
USPC ......................................................... 411/160
See application file for complete search history.

(56) References Cited

U.S. PATENT DOCUMENTS

| | | |
|---|---|---|
| 325,235 A | 9/1885 | Bulmer et al. |
| 329,615 A | 11/1885 | Andrews |
| 878,476 A | 2/1908 | Barker |
| 1,183,174 A | 5/1916 | Dice |
| 1,724,595 A | 8/1929 | Hyle |
| 1,878,199 A | 9/1932 | Stenger |
| 1,916,526 A | 7/1933 | Olson |
| 2,034,258 A | 3/1936 | Hausser |
| 2,034,494 A | 3/1936 | Stoll |
| 2,069,402 A | 2/1937 | Cowlin |
| 2,149,359 A | 3/1939 | Olson |

(Continued)

FOREIGN PATENT DOCUMENTS

| | | |
|---|---|---|
| FR | 769005 | 8/1934 |
| FR | 49768 | 7/1939 |
| JP | 06309640 | 11/1994 |

*Primary Examiner* — Roberta Delisle
(74) *Attorney, Agent, or Firm* — Dickinson Wright PLLC

(57) ABSTRACT

A bonding washer for making electrical connection between two metal pieces that are to be mechanically fastened together. The washer, to be interposed between the two metal pieces, may be constructed so as to fasten to one of the pieces before the two pieces are joined. Teeth on the washer, positioned at right angles to the plane of the washer, are forced into each of the two metal pieces when the fastener is tightened, making electrical connection between the two metal pieces.

25 Claims, 16 Drawing Sheets

(56) References Cited

U.S. PATENT DOCUMENTS

| | | |
|---|---|---|
| 2,179,575 A | 11/1939 | Hosking |
| 2,250,280 A | 7/1941 | Starbird |
| 2,271,732 A | 2/1942 | Chappuis |
| 2,561,679 A | 7/1951 | Waller |
| 2,796,457 A | 6/1957 | Stinger |
| 2,934,684 A | 4/1960 | Fegan |
| 3,138,658 A | 6/1964 | Weimer |
| 3,175,462 A | 3/1965 | Disley |
| 3,247,316 A | 4/1966 | Weimer, Jr. |
| 3,285,313 A | 11/1966 | Blakesley |
| 3,340,494 A | 9/1967 | Gutshall |
| 3,481,381 A | 12/1969 | Black |
| 3,504,101 A | 3/1970 | Muto |
| 3,541,226 A | 11/1970 | Cea et al. |
| 3,541,227 A | 11/1970 | Bendrick |
| 3,626,357 A | 12/1971 | Kindell et al. |
| 3,719,919 A | 3/1973 | Tibolla |
| 3,761,867 A | 9/1973 | Churla |
| 4,022,262 A | 5/1977 | Gunn |
| 4,023,882 A | 5/1977 | Pettersson |
| 4,263,474 A | 4/1981 | Tennant |
| 4,406,505 A | 9/1983 | Avramovich |
| 4,473,714 A | 9/1984 | Brownell et al. |
| 4,498,715 A | 2/1985 | Peppler |
| 4,560,224 A | 12/1985 | Weisenburger |
| 4,659,870 A | 4/1987 | Jones |
| 4,704,058 A | 11/1987 | Grunwell |
| 4,859,205 A * | 8/1989 | Fritz .................. H01R 12/772 439/393 |
| 4,900,209 A | 2/1990 | Reynolds |
| 4,961,712 A | 10/1990 | Schwenk et al. |
| 5,078,613 A | 1/1992 | Salmon |
| 5,100,506 A | 3/1992 | Sturtevant et al. |
| 5,207,588 A | 5/1993 | Ladouceur et al. |
| 5,236,272 A | 8/1993 | Hibbard |
| 5,399,096 A | 3/1995 | Quillet et al. |
| 5,435,746 A | 7/1995 | Leeb |
| 5,441,417 A | 8/1995 | Ladouceur et al. |
| 5,453,027 A | 9/1995 | Buell et al. |
| 5,501,008 A | 3/1996 | Leeb |
| 5,620,290 A | 4/1997 | Homfeldt et al. |
| 5,644,830 A | 7/1997 | Ladouceur et al. |
| 5,828,008 A | 10/1998 | Lockwood et al. |
| 6,343,904 B1 | 2/2002 | Wang |
| 6,347,915 B1 | 2/2002 | Balzano |
| 6,368,038 B1 | 4/2002 | Uno |
| 6,939,097 B2 | 9/2005 | Carr et al. |
| 6,976,816 B2 | 12/2005 | Slesinski et al. |
| 6,987,660 B2 | 1/2006 | Stevenson et al. |
| 8,092,129 B2 | 1/2012 | Wiley et al. |
| 8,353,650 B2 | 1/2013 | Wiley et al. |
| 8,608,418 B2 | 12/2013 | Wiley et al. |
| 2003/0031526 A1 | 2/2003 | Grant |

* cited by examiner

DETAIL A

SECTION D-D

BONDING WASHER

CROSS-REFERENCE TO RELATED APPLICATIONS

This application is a continuation of application Ser. No. 14/084,405, filed Nov. 19, 2013, which is a continuation of Ser. No. 13/619,032, filed Sep. 14, 2012 (now U.S. Pat. No. 8,608,418), which is a continuation of application Ser. No. 13/324,688, filed Dec. 13, 2011 (now U.S. Pat. No. 8,353,650), which is a continuation of application Ser. No. 11/308,683, filed Apr. 21, 2006 (now U.S. Pat. No. 8,092,129), all of which are incorporated by reference herein in the entirety.

FEDERALLY SPONSORED RESEARCH

Not Applicable

REFERENCE TO SEQUENCE LISTING

Not Applicable

BACKGROUND OF THE INVENTION

Field of the Invention

This invention relates to construction of photovoltaic arrays and other apparatus requiring electrical connection between metal parts.

Prior Art

This invention has been devised for use in installing a photovoltaic array composed of a number of photovoltaic modules that are assembled onto a larger mounting structure. The frames of the individual photovoltaic modules and the structural pieces on which the modules mount are generally made out of aluminum. The aluminum is anodized to resist corrosion. As in any source of electrical power, to ensure safety the metal pieces must be bonded together. Bonded is used here in the technical sense to mean permanently joined to form an electrically conductive path that ensures electrical continuity and has the capacity to safely conduct any current likely to be imposed. Although the frames of the modules are directly bolted or clamped to the mounting pieces, the anodizing insulates the pieces so that they are not electrically connected together.

A common practice in the industry is to install a separate grounding lug on each piece that is anodized. The grounding lug is attached to the sheet metal frame of the modules with a thread forming stainless steel screw. Since the screw cuts into the aluminum it forms an air-tight connection which will maintain good electrical connection over time. A common sheet metal thickness is 0.080 inch and a common screw size is 10-32 so that the screw therefore only makes connection on about 2½ threads. This gives a marginally acceptable surface contact area in terms of mechanical strength and electrical conductivity. It would be desirable to have a design where the electrical contact area can be made much larger.

The stainless steel screw contacts a star washer which in turn contacts the grounding lug body. The grounding lug accepts a copper wire which is forced to contact the grounding lug by a stainless steel set screw. There are thus four connection points which must be made, sheet metal to screw, screw to star washer, star washer to lug, and lug to copper wire. It would be desirable to have a design where there are only two electrical connection points.

Copper wire is strung between grounding lugs on all the metal pieces and eventually to a ground electrode. The grounding lugs themselves are expensive and time consuming to install and the wiring adds both material and labor cost which increase the price of the overall system. It would be preferable if the electrical connection was made directly between the metal pieces when they are assembled together.

Star washers, such as that in FIG. 1, are generally available for making electrical connections. They are constructed so that they can be punched and formed out of flat metal stock. The forming process makes a number of internal or external teeth that are usually twisted so that they extend above and below the plane of the washer body. Star washers make electrical connection to an adjacent piece because they tend to dig in to the adjacent piece as they are rotated and compressed by a nut and bolt being tightened. In the intended application, they would be inserted in between the two pieces of metal to be bonded. They will therefore be separated from the nut and bolt by a layer of material and so will not rotate in the usual manner and therefore will be less effective. Star washers are intended for applications where all they have to break through is grease or dirt on a metal surface, but anodized aluminum is a very hard material. The teeth of a star washer will act like springs and deform back to a flat surface when compressed. This is desirable for most applications because the spring action maintains contact. In this application, however, depending on the thickness of the anodizing, the star washer may or may not penetrate the anodizing to make connection with the underlying aluminum metal. Some examples of this type construction are found in U.S. Pat. No. 5,453,027 (Buell et al., 1995), U.S. Pat. No. 5,620,290 (Homfeldt et al., 1997), and U.S. Pat. No. 6,939,097 (Carr et al., 2005), Shapes other than washers may also use these twisted type teeth, as in the clips of U.S. Pat. No. 4,406,505 (Avramovich 1983) and No. 4,961,712 (Schwenk et al., 1990).

One might consider using a washer so thick that the teeth are unable to spring back to the flat condition; however, such a piece would not easily fit in between two metal pieces and may cause the two metal pieces to deform. Also since a thick washer requires more material, it would be more expensive.

A better washer would be constructed so that the teeth are at right angles to the metal pieces to which contact should be made. Then, when the washer is tightened against the metal pieces, the teeth will not be able to spring back into the plane of the washer and will be forced to embed themselves into the adjacent piece. In embedding, both the teeth and the metal piece being contacted will deform together, resulting in a contact area where air is excluded so that the contact area will not be subject to corrosion. The height of the teeth can be designed so that the washer is guaranteed to punch through a specified thickness of anodizing. The shape and number of teeth can be designed to give a desired contact area and therefore a desired electrical resistance. The contact could be made along the inner diameter of a hole in the metal pieces; however, that might limit the amount of contact area available so it would be preferable to contact the metal pieces on an exposed face.

The washer of U.S. Pat. No. 5,828,008 (Lockwood et al., 1998) does have teeth at right angles to the piece to be contacted; however, they are only on one face. For use with machine screws, two of these washers are required. In that case, the conduction path is from the first metal piece to be connected, to the first washer, then to the machine screw, then to the second washer, then to the second metal piece to be connected. Since the conduction path has four places where current transitions between parts, there is great likelihood of a poor connection at one of the transition points and hence poor reliability. In addition, the total connection path is much longer than necessary and therefore will have relatively high resistance. A final problem is that the screw must generally be made of stainless steel to resist corrosion. The relatively poor electrical conductivity of stainless steel and the long path through the screw will limit the amount of current which can be safely conducted.

In the case of Lockwood, the washer is constructed with a concave shape. As the fastener is tightened, the washer will flatten. This change in shape will give a radial motion to the teeth which will scrape across the metal surface. For anodized surfaces the scraping may not be enough to break through the coating. It would be preferable to have the teeth directly penetrate some distance into the metal.

U.S. Pat. No. 5,435,746 (Leeb 1995) and associated U.S. Pat. No. 5,501,008 (1996) also use an electrical contact at right angles to the piece to be contacted, but it is intended for use with specialized assembly tooling and an adhesive which makes the connection permanent. In the case of application to solar modules, it is necessary to provide for module repair or replacement and a permanent connection is inappropriate.

One might consider use of the electrical grounding stud as described in U.S. Pat. No. 5,207,588 (Ladouceur et al., 1993), U.S. Pat. No. 5,441,417 (1995), and U.S. Pat. No. 5,644,830 (1997). This invention has a washer with right angle features connected to the washer and an attached stud, and also has right angle features connected to the washer and an attached rivet. The stud might be inserted through a hole in the frame of the solar module, then a nut fastened to the stud to hold it in place. The rivet could then be used to join to the mounting structure. This is clearly a cumbersome assembly process. In addition, the grounding stud will be an expensive part to fabricate and since typically four connectors are required per solar module, the total cost will be prohibitive.

Another problem with using available washers is that the washer needs to be inserted in between two metal pieces. When mounting a photovoltaic module there are four mounting holes, so one would need to carefully position four washers and then align the module to the mounting pieces. This would clearly be very difficult to do. It would be preferable to have a washer with features which retain it in position.

There are a number of available washers that have features for retaining to a bolt, such as that of U.S. Pat. No. 5,620,290 (Homfeldt et al., 1997), illustrated in FIG. 1. To use such a washer one would position four bolts through the holes in the frame of a module and place a washer on each bolt. The module would then be positioned on the mounting structure, then the module secured in place with four nuts. There are several problems here. The first is that the retaining force may not be large enough, and as the large and cumbersome module is positioned, the bolts may be knocked loose. It would be preferable to retain the washer directly to the module or mount, and then insert the bolts after the pieces have been aligned. A second problem is that the available washers are of the star type construction and do not guarantee connection as detailed previously.

There are several manufacturers who make inserts that are press fit into sheet metal parts and could thus provide the desired retention feature. For the least assembly effort, it would be desirable to construct the electrical connecting washer as an integral part of such an insert. Since the press fit process will also guarantee electrical connection, only one side of the washer would need to have the electrical connecting features.

For very high volume applications, it would be desirable to integrate the washer into the fastener and therefore eliminate assembly steps.

Accordingly, several objects and advantages of the present invention are:
1. to provide a washer which will guarantee electrical continuity between two metal pieces after they have been mechanically assembled even if the pieces are made of anodized aluminum;
2. to provide a washer with a large surface contact area for low electrical resistance;
3. to provide a washer which will be retained on one metal piece so that a second metal piece may be aligned to the first metal piece for mechanical assembly without disturbing the washer;
4. to provide a washer which requires no special tooling but makes electrical connection during the mechanical assembly process.
5. to provide a washer which can be integrated with a fastener for minimum assembly time.

Still further objects and advantages will become apparent from a consideration of the ensuing description and drawings.

BRIEF SUMMARY OF THE INVENTION

The present invention consists of a bonding washer for maintaining electrical connection in the joining of two metal pieces, constructed with metal teeth perpendicular to the body of the washer, and may be constructed so as to fasten to one of the metal pieces before assembly.

REFERENCE NUMERALS IN DRAWINGS

Figure 1:
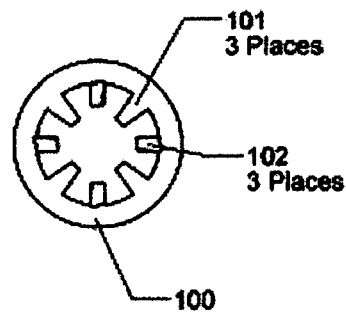
FIG. 1 shows a prior art washer with bolt retention features.

100—star washer body (prior art)
101—longer teeth of star washer (prior art)
102—shorter teeth of star washer (prior art)
200—screw (prior art)
201—upper metal piece (prior art)
202—star washer (prior art)
203—lower metal piece (prior art)
300—single tooth formed by triangular punch
400—four teeth formed by square punch
500—multiple teeth formed by circular punch
600—single circular tooth formed by circular punch
700—tooth formed by pin
800—tooth formed by two opposed circular teeth
900—upward-facing teeth (preferred embodiment)
901—upper washer section (preferred embodiment)
902—downward-facing teeth (referred embodiment)
903—lower washer section (preferred embodiment)
904—hinge (preferred embodiment)
905—clearance hole (preferred embodiment)
906—fingers (preferred embodiment)
1000—hole in first metal piece
1001—first metal piece
1100—bolt
1101—flat washer
1102—second metal piece
1103—hole in second metal piece
1104—flat washer
1105—split washer
1106—nut
1200—upward-facing teeth (first alternative embodiment)
1201—body (first alternative embodiment)
1202—clearance opening (first alternative embodiment)
1203—U-shaped bend (first alternative embodiment)
1204—tab (first alternative embodiment)
1301—downward-facing teeth (first alternative embodiment)
1500—upward-facing teeth (second alternative embodiment)
1501—first body section (second alternative embodiment)
1502—second set of upward-facing teeth (second alternative embodiment)
1503—second body section (second alternative embodiment)
1600—upward-facing teeth (third alternative embodiment)
1601—downward-facing teeth (third alternative embodiment)
1602—spring fingers (third alternative embodiment)
1700—metal rail
1701—side of metal rail
1702—second side of metal rail
1800—downward contacting teeth (fourth alternative embodiment)
1801—upward-facing teeth (fourth alternative embodiment)
1802—tubular section (fourth alternative embodiment)
1803—flat portion (fourth alternative embodiment)
2000—flat washer section (fifth alternative embodiment)
2001—double pointed pin (fifth alternative embodiment)
2002—hole retention feature (fifth alternative embodiment)
2100—adhesive layer (sixth alternative embodiment)
2101—diamond (sixth alternative embodiment)
2102—backing sheet (sixth alternative embodiment)
2200—flat washer section (seventh alternative embodiment)
2201—downward-facing teeth (seventh alternative embodiment)
2202—tubular body (seventh alternative embodiment)
2203—slits (seventh alternative embodiment)
2204—outward-facing teeth (seventh alternative embodiment)
2600—threaded section (eighth alternative embodiment)
2601—tubular body (eighth alternative embodiment)
2800—mandrel tail (ninth alternative embodiment)
2801—tubular body (ninth alternative embodiment)
2802—washer section (ninth alternative embodiment)
2803—slits (ninth alternative embodiment)
2804—outward-facing teeth (ninth alternative embodiment)
2805—downward-facing teeth (ninth alternative embodiment)
2900—mandrel head (ninth alternative embodiment)
2901—closed tubular end (ninth alternative embodiment)
3100—first set of teeth (tenth alternative embodiment)
3101—second set of teeth (tenth alternative embodiment)
3102—nut (tenth alternative embodiment)
3103—clearance hole (tenth alternative embodiment)
3104—captive bolt (tenth alternative embodiment)
3105—body section (tenth alternative embodiment)
3200—first set of teeth (eleventh alternative embodiment)
3201—second set of teeth (eleventh alternative embodiment)
3202—first metal piece of first solar panel (eleventh alternative embodiment)
3203—second metal piece or second solar panel (eleventh alternative embodiment)
3204—clearance hole (eleventh alternative embodiment)
3205—body section (eleventh alternative embodiment)

3300—downward-facing teeth (twelfth alternative embodiment)

3301—washer section (twelfth alternative embodiment)

3400—second metal piece (twelfth alternative embodiment)

DETAILED DESCRIPTION

FIGS. 1 Through 5
Preferred Embodiment

Figure 2:
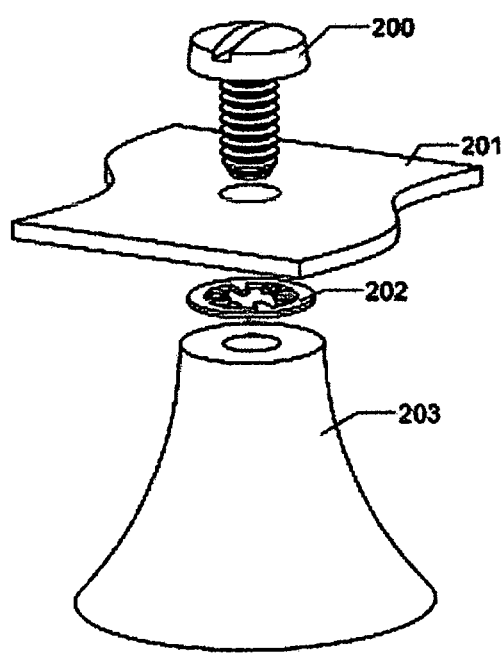
FIG. 2 shows an exploded view of an assembly with a prior art washer with bolt retention features.
Figure 3:
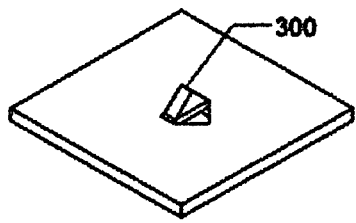
FIGS. 3-8 show perpendicular teeth construction details.
Figure 4:
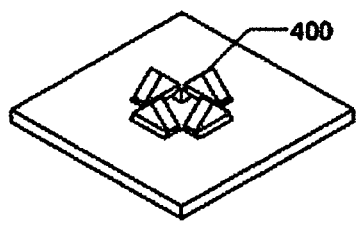
Figure 5:
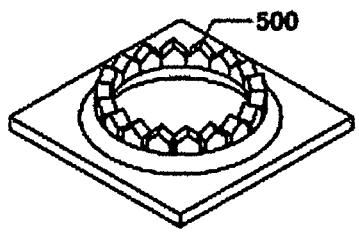
Figure 6:
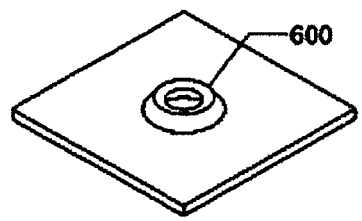

FIG. 1 illustrates features of the prior art. This star washer is formed from a flat metal piece. Star washer body 100 has two sets of teeth on its internal circumference. FIG. 2 illustrates the prior art in an assembly. The longer teeth 101 will retain the washer on the threads of screw 200, the shorter teeth 102 will make electrical connection to the upper metal piece 201 and lower metal piece 202 when the fastener is tightened. Teeth 102 are twisted out of the plane of the washer body 100. When screw 200 is tightened, upper metal piece 201 and lower metal piece 202 will press on the teeth 102. Since the washer is made out of a spring metal, teeth 102 will resist the tightening. As screw 200 is tightened, teeth 102 will scrape against upper metal piece 200 and lower metal piece 201. This scraping is sufficient to clear dirt or grease from a surface, but is too weak to break through an anodized surface. As screw 200 is further tightened, the teeth 102 will be forced back into the plane of the star washer body 100.

FIGS. 3-8 show several methods of constructing teeth which are perpendicular to the plane of the washer. As shown in FIGS. 3-6, one may punch out a single triangular tooth 300 with a triangular punch, or one may punch out four triangular teeth 400 with a square punch. A larger number of teeth 500 may be formed with a round shape. To simplify the forming process, a single circular tooth 600 may be made. The circular tooth has the advantage that the resulting structure is very rigid. It should be apparent to those skilled in the art that more complex shapes could also be used to form teeth. While punching is probably the simplest method of forming thin metal pieces into the desired shape, it should be apparent to those skilled in the art that other methods such as casting, machining, pressure forming, and photochemical machining could be used. The important distinction over the prior art is that the perpendicular orientation of the teeth allows for greater mechanical contact and hence greater electrical contact.

Figure 7:
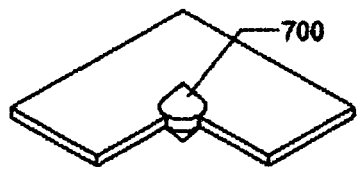
Figure 8:
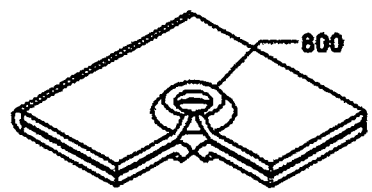

As shown in FIG. 7, pins may also be used to obtain the desired perpendicular structure instead of forming sheet metal. It should be apparent to those skilled in the art that the pins may also be hollow, for instance in a cylindrical shape, or may have an irregular shape. During assembly the opposing pin points will transmit forces directly between the two pieces to be connected and so will be the best way to ensure that the pins embed into the two pieces. The opposing points also will have a short direct path between the pieces to be connected and therefore have very low resistance; however, this may not be a cost-effective method. A more practical method may be to construct a pin-like structure as is shown in FIG. 8. Two circular teeth 800 are constructed on a sheet which is then folded so that the teeth are directly opposed. As shown in FIG. 8, the teeth have a cross-sectional height greater than their cross-sectional thickness, and, also in cross-section, are asymmetrical with respect to the perpendicular.

Figure 9:
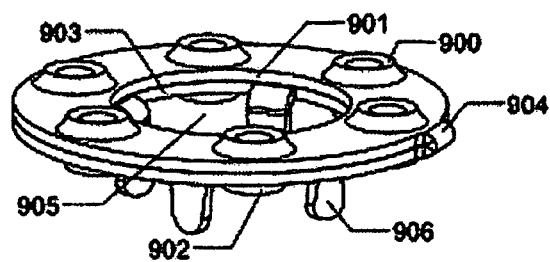
FIG. 9 shows the preferred embodiment of the invention.

FIG. 9 shows the preferred embodiment of the invention. The bonding washer is formed out of a thin metal sheet. Upward-facing teeth 900 are perpendicular to upper washer section 901. Downward-facing teeth 902 are perpendicular to lower washer section 903. The teeth are formed, then the part is folded on hinge 904 so that the teeth are in direct opposition. The teeth 900 and 902 are shown with a simple smooth circular shape. It should be evident to those skilled in the art that more complicated shapes could also be used. A clearance opening in the form of a hole 905 allows a fastener to be inserted through the bonding washer. Extending downward on the inner circumference of clearance hole 905 are fingers 906.

Figure 10:
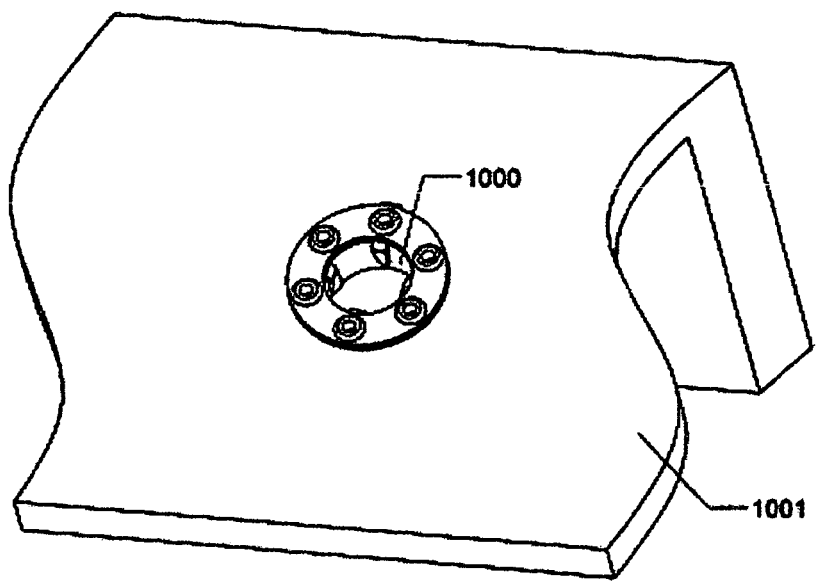
FIG. 10 shows the preferred embodiment of the invention inserted onto a metal piece.

FIG. 10 shows the preferred embodiment after it has been pushed into a hole 1000 of first metal piece 1001. Fingers 906 are constructed with a twist so that they provide a spring force to retain the bonding washer in position. The preferred embodiment is shown with four fingers. This number allows the preferred embodiment to provide retention in holes and also in slots where the slot opening is equal to the distance between adjacent fingers. It should be apparent to someone skilled in the art that other numbers of fingers could also be used.

Figure 11:
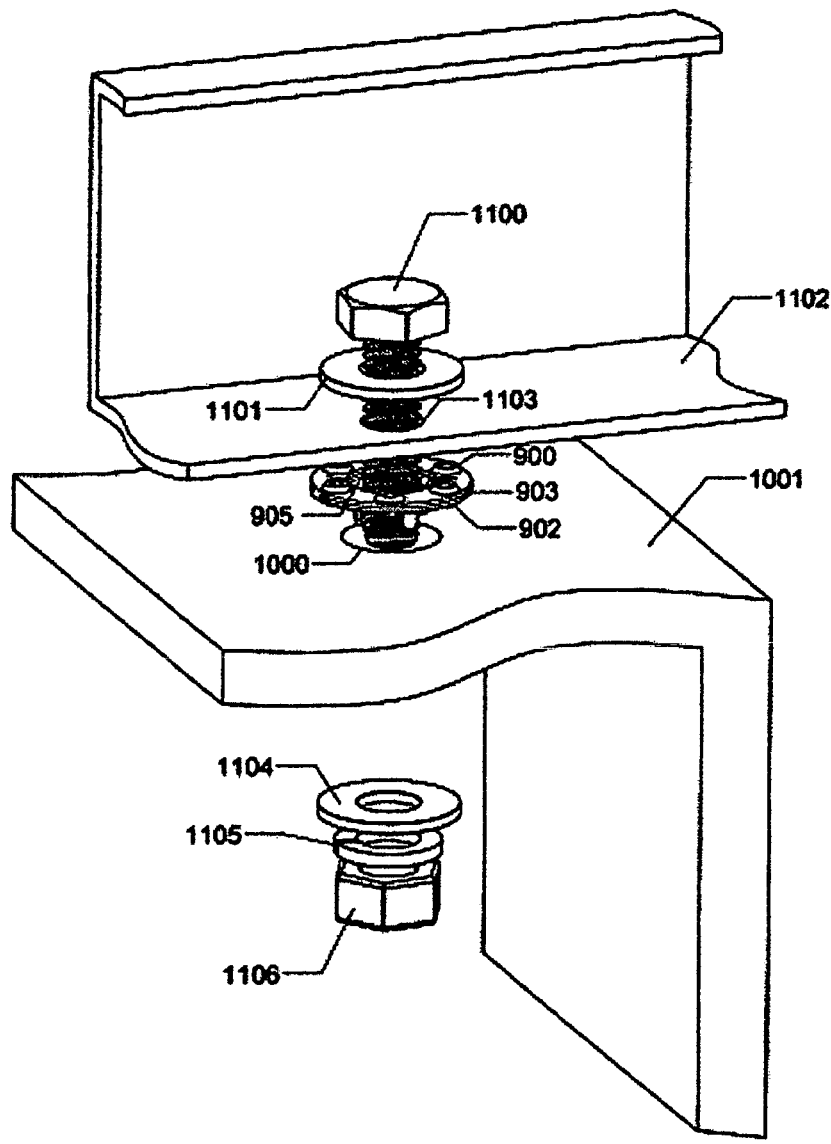
FIG. 11 shows an exploded view of an assembly with the preferred embodiment.

FIG. 11 shows an exploded assembly with the preferred embodiment. Bolt 1100 is inserted through flat washer 1101, second metal piece clearance hole 1103, preferred embodiment clearance hole 905, first metal piece 1001, flat washer 1104, split washer 1105 and nut 1106. As nut 1106 is tightened, downward-facing teeth 902 will be forced into first metal piece 1001, upward-facing teeth 900 will be forced into second metal piece 1102. First metal piece 1001 and second metal piece 1102 are preferably formed of anodized aluminum. Since the downward-facing teeth 902 are perpendicular to the surface of the lower washer section 903 and the surface of the first metal piece 1001, the teeth cannot spring back but must embed into the surface of the first metal piece 1001. Similarly, the upward-facing teeth 900 will embed into the surface of the second metal piece 1102. The bonding washer is made of a material harder than that of the first metal piece 1001 and the second metal piece 1102. The bonding washer may also have a thin coating of a material such as chromium or titanium nitride in order to achieve the desired hardness. Because the upward-facing teeth 900 and the downward-facing teeth 902 are in close proximity, the electrical path from the first metal piece through the bonding washer to the second metal piece is extremely short, and therefore the connection has low electrical resistance.

The preferred embodiment is shown with a bolt and nut, but it should be apparent to one skilled in the art that other types of fasteners may be used, including through hole type fasteners such as rivets. Clamping type fasteners which are positioned outside the first and second metal pieces may also be used.

Height, cross-sectional area, and number of downward-facing teeth and upward-facing teeth can be chosen in order to achieve a desired value of electrical conductivity. These choices must be traded off against the clamping force required to force the pieces together.

Alternative Embodiments
FIGS. 12-34

Figure 12:
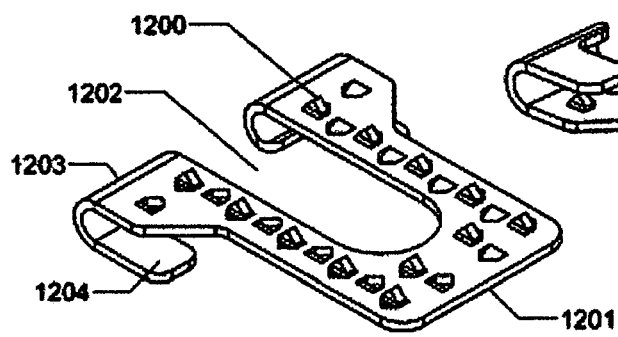
FIGS. 12-13 show an alternative embodiment of the invention with clip feature for thin metal pieces.
Figure 13:
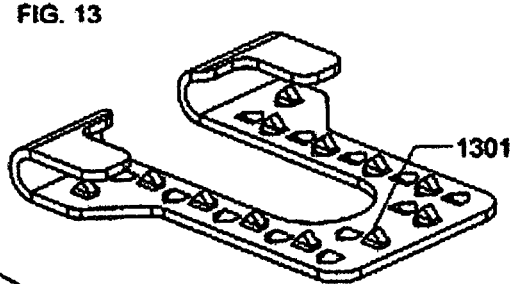

FIGS. 12 and 13 show two views of an alternative embodiment of the invention, a U-shaped metal sheet featuring upward-facing teeth 1200 and downward-facing teeth 1301, perpendicular to body 1201, and an elliptical clearance opening 1202. The end of each arm of the "U" is curved into a perpendicular U-shaped bend 1203, ending in tab 1204, which forms a spring clip.

Figure 14:
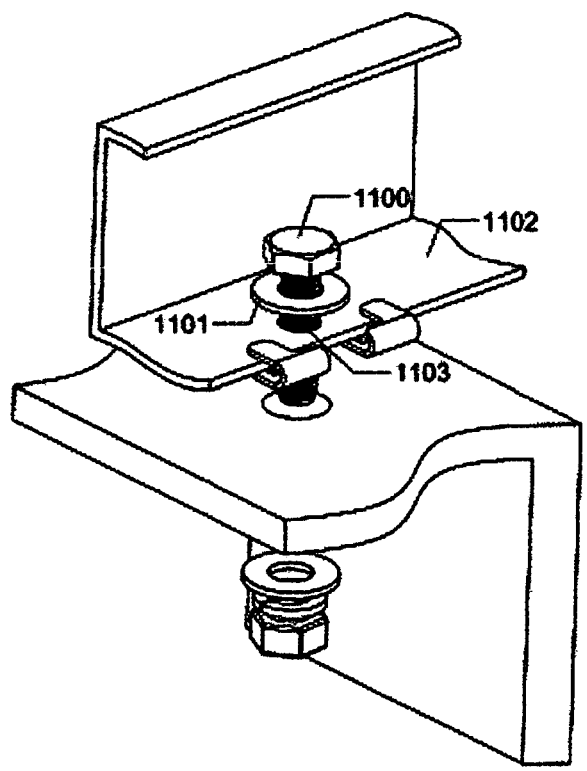
FIG. 14 shows an alternative embodiment of the invention with clip feature inserted onto a thin metal piece.

FIG. 14 shows this alternative embodiment, pushed onto the edge of second metal piece 1102. The spring clip formed by U-shaped bend 1203 and tab 1204 attaches the bonding washer to the second metal piece 1102. Tab 1204 is constructed to be outside the diameter of flat washer 1101 so that flat washer 1101 can provide even force against second metal piece 1102. Clearance opening 1202 allows a fastener to be inserted through the bonding washer. Clearance opening 1202 is somewhat elliptical in shape in order to accommodate variability in the position of hole 1103.

Figure 15:
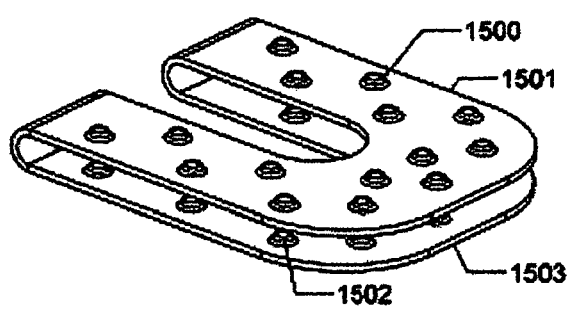
FIG. 15 shows a second alternative embodiment of the invention with clip feature for thin metal pieces.

FIG. 15 shows a second alternative embodiment of the invention, a clip formed by a pair of parallel U-shaped plates joined by two U-shaped bends and having a first set of upward-facing teeth 1500 on first body section 1501 and a second set of upward-facing teeth 1502 on second body section 1503. When the clip is mounted on a metal piece, the second set of upward-facing teeth 1502 will contact that metal piece. After assembly, the first set of upward-facing teeth 1500 will contact a second metal piece. By using two body sections, more teeth can be accommodated and in general this will result in reduced electrical resistance through the teeth. The electrical path from the first metal piece through the clip to the second metal piece is now longer than for the first alternative embodiment, so that portion of the electrical resistance will be greater. Depending on the exact details of construction the total electrical resistance may be greater or less than for the first alternative embodiment.

A variation of this embodiment would allow the clip to be pushed on after first metal piece 1001 and second metal piece 1102 have been positioned together. In that case, the teeth would be made to contact both pieces from the outside.

Figure 16:
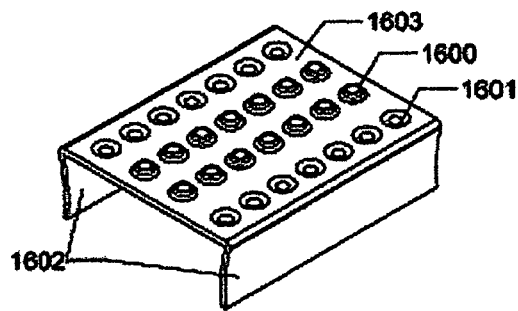
FIG. 16 shows a third alternative embodiment of the invention with finger retention feature for metal rails.
Figure 17:
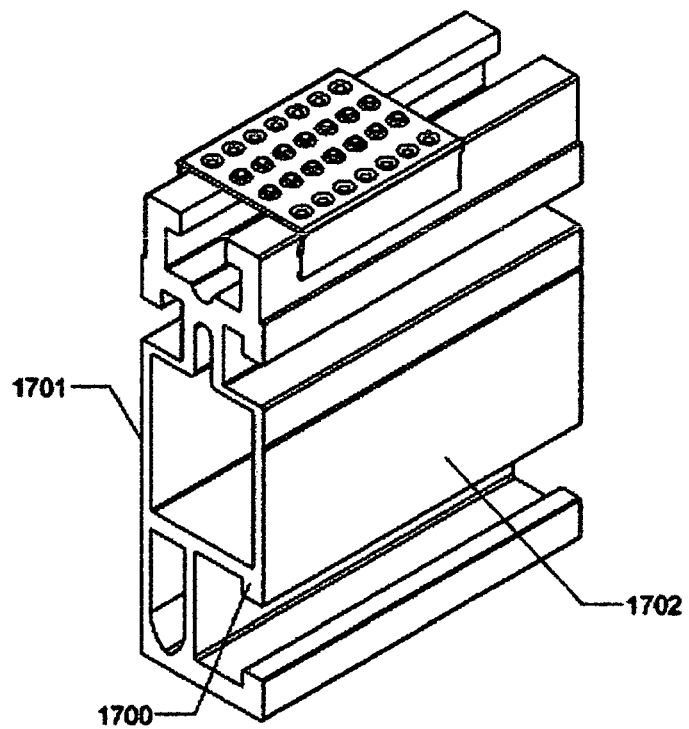
FIG. 17 shows a third alternative embodiment of the invention with finger retention feature mounted on a metal rail.

FIG. 16 shows a third alternative embodiment of the invention, which takes the form of a clamp with two vertical sides, comprising spring fingers 1602, perpendicular to a flat rectangular surface 1603 bearing upward-facing teeth 1600 and downward-facing teeth 1601. FIG. 17 shows how the spring fingers grab on to the sides 1701 and 1702 of a metal rail 1700. The spring fingers retain the clamp in place on metal rail 1700 while it is assembled into a larger structure. The fastener for the third alternative embodiment will generally be of the clamping type for use in applications where clamping is appropriate, as opposed to bolting through a clearance hole.

Figure 18:
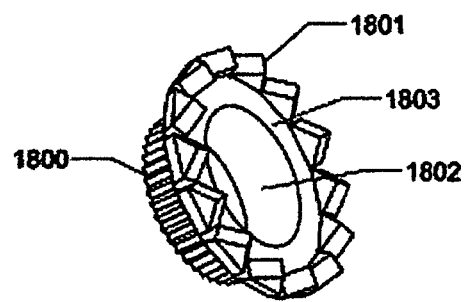
FIG. 18 shows a fourth alternative embodiment of the invention with press fit retention feature.
Figure 19:
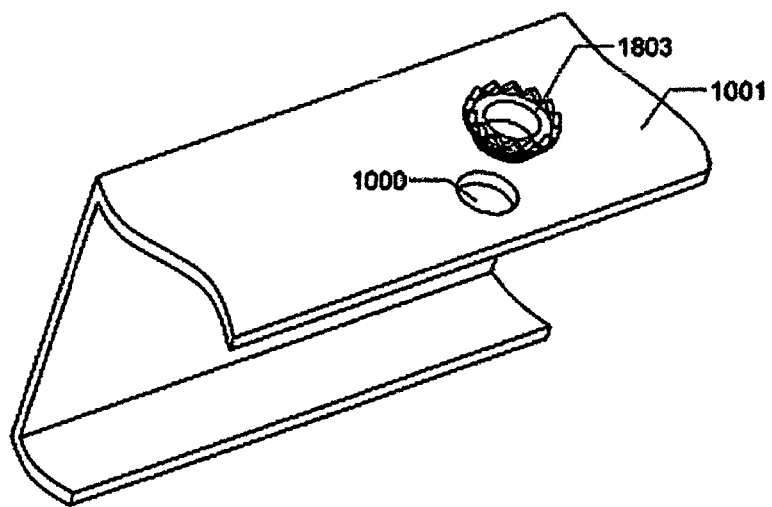
FIG. 19 shows a fourth alternative embodiment of the invention with press fit retention feature inserted into a metal piece.

FIGS. 18 and 19 show a fourth alternative embodiment of the invention and its application, respectively. A circular washer bears upward-facing teeth 1801. Downward contacting teeth 1800 are perpendicular to tubular section 1802. The outer diameter of the downward contacting teeth 1800 is chosen so that it can be press fit into first metal piece 1001. A tool is required which can exert sufficient pressure on flat portion 1803 in order to force the bonding washer into hole 1000, deforming the material of first metal piece 1001 around hole 1000. As a result of this press-fit operation, the bonding washer is firmly mechanically and electrically joined to first metal piece 1001, as shown in FIG. 19. The first metal piece 1001 may now be mechanically assembled into a larger structure, such that teeth 1801 will embed in the metal of the larger structure.

Figure 20:
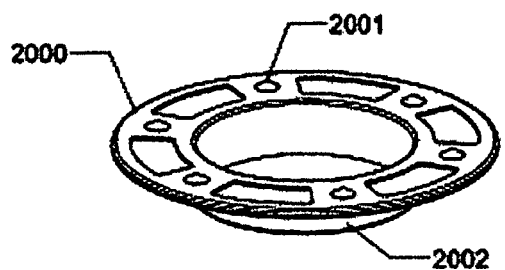
FIG. 20 shows a fifth alternative embodiment of the invention with pin features.

FIG. 20 shows a fifth alternative embodiment of the invention. Flat washer-like section 2000 has embedded pins 2001. The pins 2001 are pointed at both ends and so will embed into the two metal pieces during assembly to make electrical contact. Since conduction is only through the pins, flat washer-like section 2000 may be made of plastic. Retention feature 2002, a short cylinder attached to the washer-like section, is also made of plastic and so may readily deform when pressed into a hole. The plastic should be chosen to provide a spring action which retains the washer in the hole.

Figure 21:
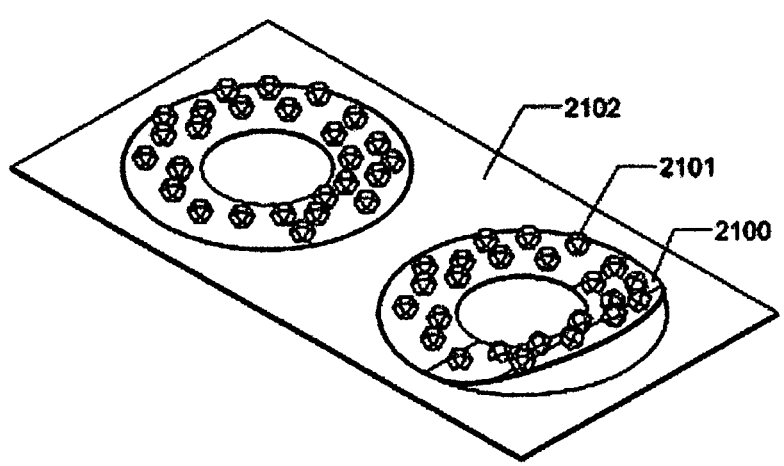
FIG. 21 shows a sixth alternative embodiment of the invention with diamonds substituted for pins.

FIG. 21 shows a sixth alternative embodiment of the invention. Double-sided adhesive sheet 2100 has small industrial diamonds 2101 stuck to one side. The sheet 2100 may be peeled off backing sheet 2102, exposing adhesive on its underside. Sheet 2100 may then be stuck to a metal piece, the adhesive retaining the washer and diamonds in position. The force applied during assembly will cause the diamonds to penetrate the adhesive. The irregular shape of the diamonds will allow them to function like the pins of the fifth alternative embodiment directly conducting current from one metal piece to the other.

Figure 22:
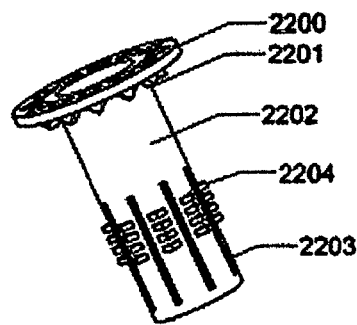
FIG. 22 shows a seventh alternative embodiment of the invention with features for electrical connections on the outside of the pieces being assembled.
Figure 23:
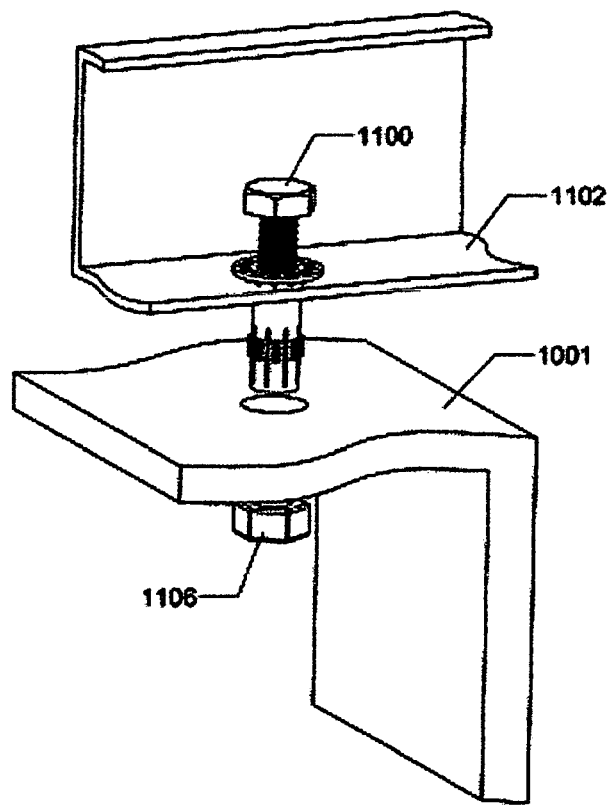
FIG. 23 shows a seventh alternative embodiment of the invention with features for electrical connection on the outside of the pieces being assembled in exploded view.

FIGS. 22 and 23 show a seventh alternative embodiment of the invention, in isolation and aligned with pieces to be attached, respectively. One end has a flat washer section 2200, bearing downward-facing teeth 2201, which function identically to those of the preferred embodiment. Tubular body 2202 has slits 2203 which begin a distance from washer section 2200 sufficient to accommodate the combined thickness of first metal piece 1001 and second metal piece 1102. The surfaces between slits 2203 have outward facing teeth 2204 along the first half of their length.

Figure 24:
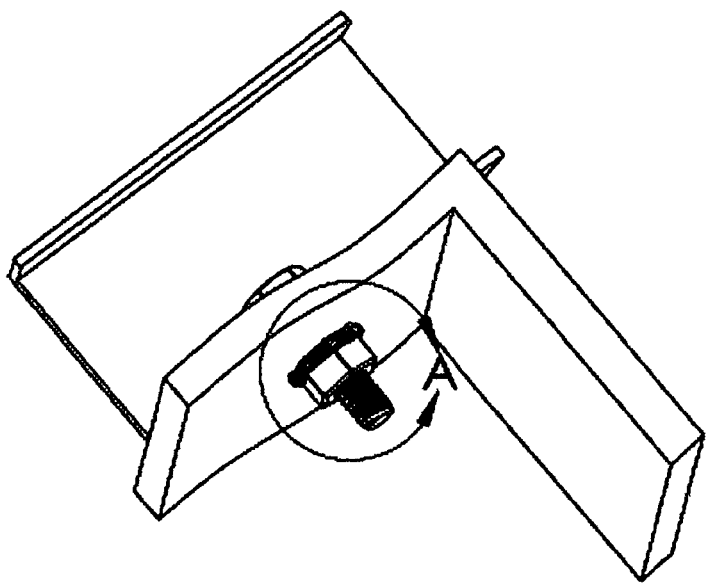
FIG. 24 shows a seventh alternative embodiment of the invention with features for electrical connections on the outside of the pieces being assembled after assembly.
Figure 25:
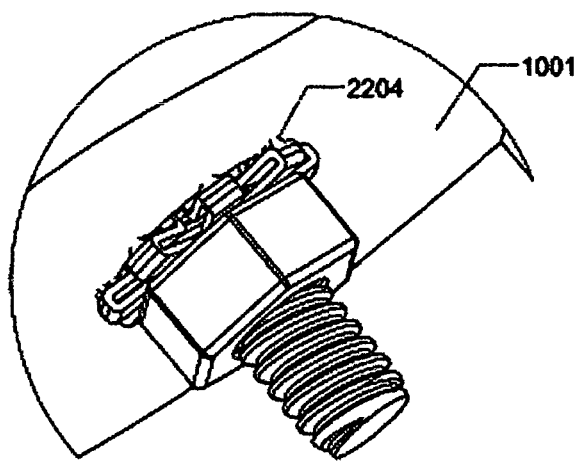
FIG. 25 shows an enlarged view of a seventh alternative embodiment of the invention with features for electrical connections on the outside of the pieces being assembled after assembly.

The seventh alternative embodiment does not have retention features. When first metal piece 1001 and second metal piece 1102 are aligned, bolt 1100 is inserted through the bonding washer unit, then bolt 1100 and the bonding washer unit together are inserted through second metal piece 1102 and first metal piece 1001. As in FIG. 11, washer 1104, split washer 1105, and nut 1106 are installed on bolt 1100. When nut 1106 is tightened, elements illustrated in FIG. 22 collapse, as tubular body 2202 folds back on itself in the vicinity of the slits 2203. (FIGS. 24 and 25 show how the outward-facing teeth 2204 will then face toward first metal piece 1001.) As nut 1106 is further tightened, downward-facing teeth 2201 embed into second metal piece 1102 and outward-facing teeth 2204 embed into first metal piece 1001, thus electrically connecting first metal piece 1001 and second metal piece 1102. Installation of the seventh alternative embodiment entails a longer electrical path between the first metal piece 1001 and second metal piece 1102 than the preferred embodiment and is therefore less desirable. It may, however, represent some cost savings in the assembly process.

Figure 26:
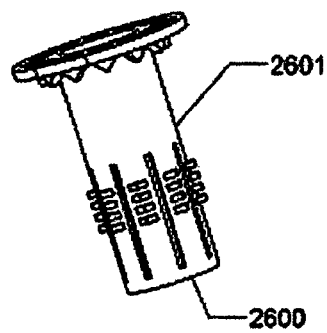
FIG. 26 shows a eighth alternative embodiment of the invention with integral threaded nut.
Figure 27:
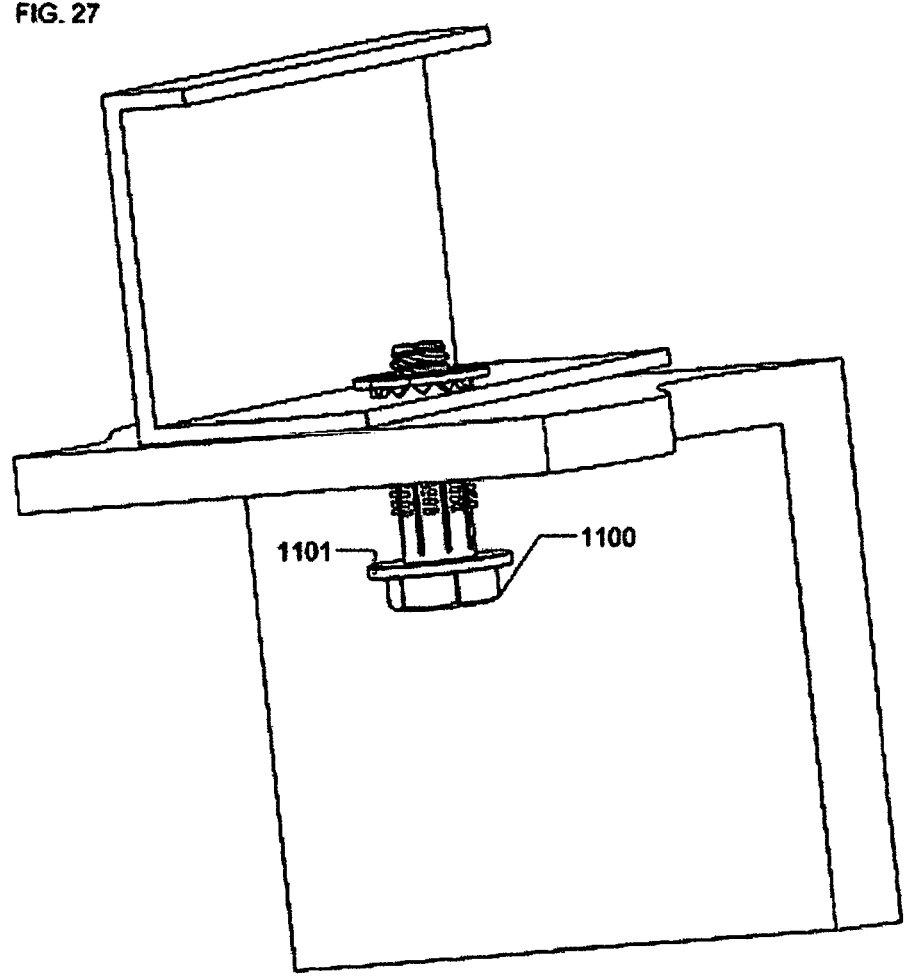
FIG. 27 shows a eighth alternative embodiment of the invention with integral threaded nut after assembly.

FIG. 26 shows a eighth alternative embodiment similar to the seventh alternative embodiment, except that nut 1106 has been replaced by a threaded section 2600 within tubular section 2601. As shown in FIG. 27, when bolt 1100 is inserted into the threaded section and tightened, it presses against washer 1101 and deforms the bonding washer unit, making electrical connection in a similar fashion as with the seventh alternative embodiment.

Figure 28:
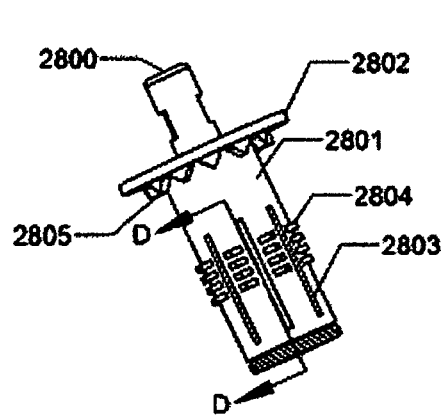
FIG. 28 shows a ninth alternative embodiment of the invention with integral rivet feature.
Figure 29:
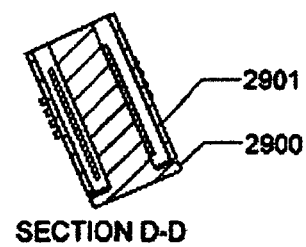
FIG. 29 shows a cross-sectional view of a ninth alternative embodiment of the invention with integral rivet feature.
Figure 30:
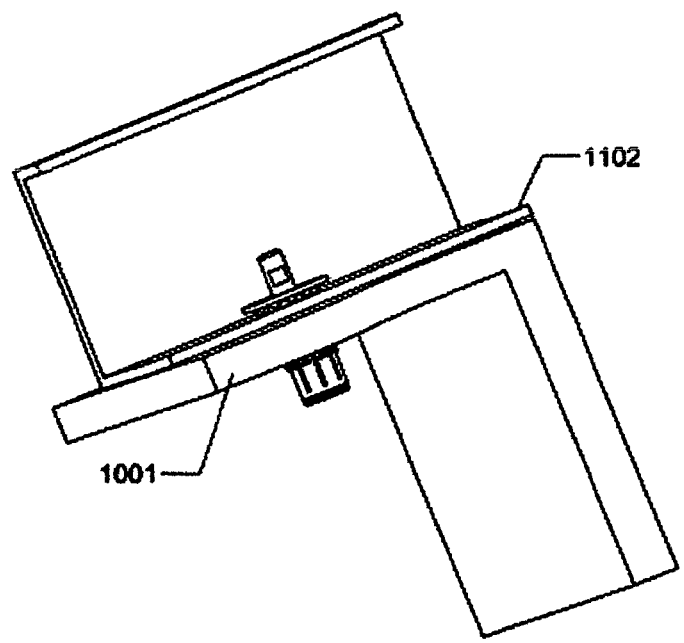
FIG. 30 shows a ninth alternative embodiment of the invention with integral rivet feature after assembly.

FIGS. 28 and 29 show a ninth alternative embodiment similar to the seventh alternative embodiment but incorporating rivet features. Mandrel head 2900 is engaged with closed tubular end 2901. Mandrel tail 2800 protrudes through tubular body 2801 and out past washer section 2802. Assembly is illustrated in FIG. 30. The holes of two metal pieces 1001 and 1102 are aligned, and the bonding washer unit is inserted through both holes. A riveting tool is used to push down on washer section 2802 while pulling on mandrel tail 2800. The pulling force will cause tubular body 2801 to deform in the vicinity of slits 2803. Outward-facing teeth 2804 will move until they face toward first metal piece 1001, in a similar manner as shown in FIGS. 24 and 25. As additional pulling force is exerted on mandrel tail 2800, downward-facing teeth 2805 embed into second metal piece 1102, and outward-facing teeth 2804 embed into first metal piece 1001, thus electrically connecting the two metal pieces. The ninth alternative embodiment has a longer electrical path between the first metal piece 1001 and second metal piece 1102 than the preferred embodiment and therefore has greater resistance. It may, however, represent some cost savings from the assembly process.

As with normal rivets, the pulling force results in a deformation of mandrel head 2900 and closed tubular end 2901 which mechanically holds the entire assembly in place. As the pulling force is further increased, mandrel tail 2800 breaks off for a finished assembly.

Figure 31:
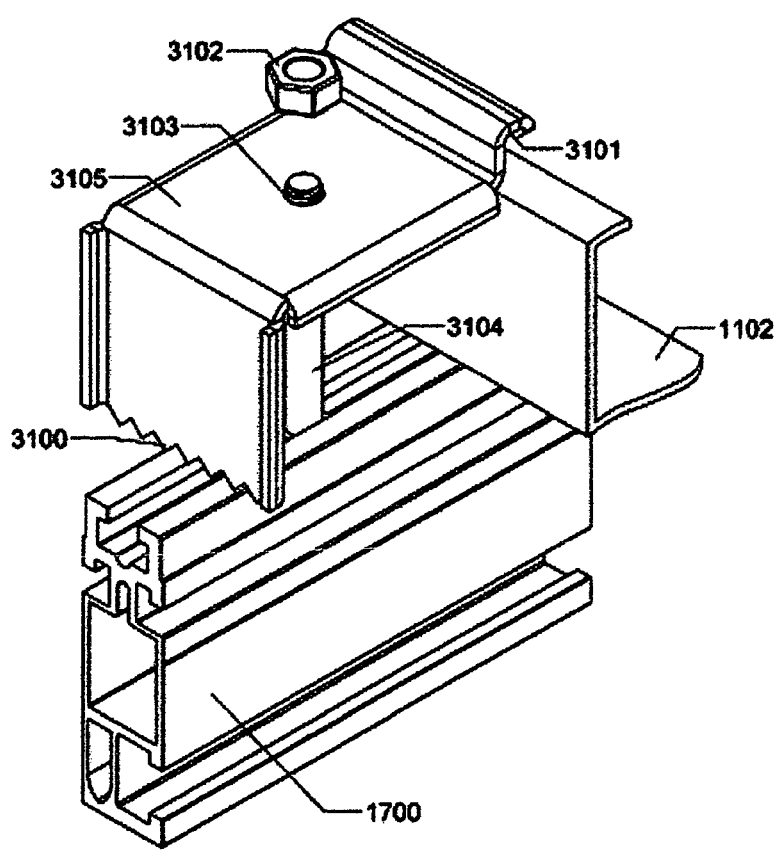
FIG. 31 shows a tenth alternative embodiment of the invention with integral solar module end clamping features.

FIG. 31 shows a tenth alternative implementation of the invention. This implementation incorporates a clamping function appropriate for use with a solar module and mounting rail. In use, second metal piece 1102 of solar module is positioned on metal rail 1700. First set of teeth 3100 are then positioned to contact metal rail 1700: second set of teeth 3101 are positioned to contact second metal piece 1102. Captive bolt 3104 is inserted through hole 3103 and screwed into nut 3102. As captive bolt 3104 is tightened against body section 3105, first set of teeth 3100 embed into metal rail 1700 and second set of teeth 3101 embed into second metal piece 1102, thus making electrical connection. Captive bolt 3104 is further tightened to provide sufficient clamping force between first metal piece 1001 and second metal piece 1102. This implementation may be fabricated with sheet metal or machined from an extruded blank. It should be apparent to someone skilled in the art that other fabrication techniques may also be used.

Figure 32:
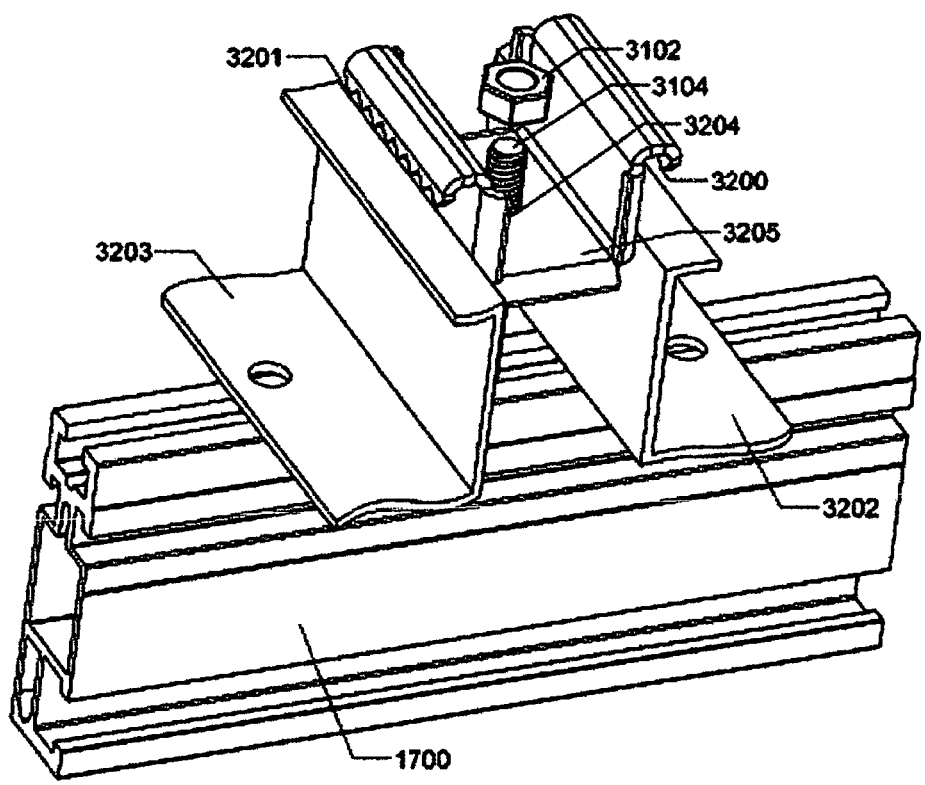
FIG. 32 shows an eleventh alternative embodiment of the invention with integral solar module midpoint clamping features.

FIG. 32 shows an eleventh alternative implementation of the invention. This implementation incorporates a clamping function appropriate for use with two solar modules and a mounting rail. In use, first set of teeth 3200 are positioned to contact first metal piece 3202 of first solar module. Second set of teeth 3201 are positioned to contact second metal piece 3203 of second solar module. Bolt 3104 is captive in mounting rail 3205. Bolt 3104 is inserted through hole 3204 and screwed into nut 3102. As nut 3102 is tightened against body section 3205, first set of teeth 3200 embed into first metal piece 3202 and second set of teeth 3201 embed into second metal piece 3203, thus making electrical connection between the two solar modules. Nut 3102 is further tightened to provide sufficient clamping force between first metal piece 3202, second metal piece 3204 and metal rail 1700.

Figure 33:
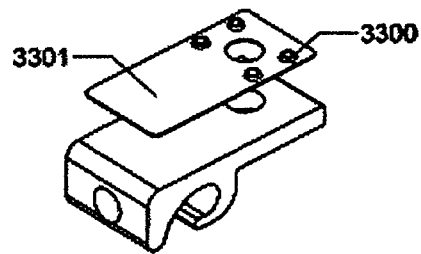
FIG. 33 shows a twelfth alternative embodiment of the invention for use when only one metal piece has an anodized coating.
Figure 34:
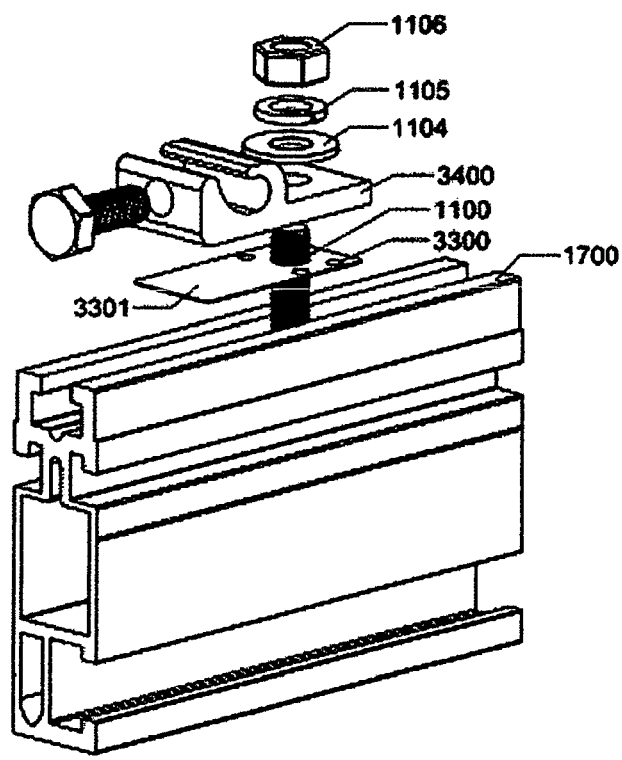
FIG. 34 shows the embodiment of FIG. 33 as it is assembled with a metal rail.

FIG. 33 shows a twelfth alternative implementation of the invention. This implementation is appropriate for use when only one of the metal pieces has an anodized coating. The bonding washer consists of a body section 3301 and one set of downward facing teeth 3300. FIG. 34 shows the twelfth alternative embodiment as it is assembled. Downward facing teeth 3300 are positioned to contact metal rail 1700. Second metal piece 3400 directly contacts washer section 3301. Second metal piece 3400 is constructed of a corrosion resistant material such as tin plated copper, zinc coated steel, or stainless steel. It should be apparent to someone skilled in the art that other suitable materials may be used. The bonding washer is also constructed out of a corrosion resistant material and therefore good electrical connection can be made just by clamping the two pieces together. As bolt 1100 and nut 1106 are tightened, downward facing teeth 3300 will forcibly embed themselves into metal rail 1700, thereby making electrical contact.

CONCLUSIONS, RAMIFICATIONS, AND SCOPE OF INVENTION

Thus the reader will see that the bonding washer of the invention provides a fastener which offers excellent electrical bonding of metal pieces used in photovoltaic and other applications. The alternative embodiments described herein make the bonding washer design adaptable to a wide range of situations, while promoting ease of assembly.

Although the description above contains many specificities, these should not be construed as limiting the scope of the invention but as merely providing illustrations of some of the presently preferred embodiments of this invention. Thus the scope of the invention should be determined by the appended claims and their legal equivalents, rather than by the examples given.

What is claimed is:

1. A bonding element to electrically connect first and second electrically conductive members, the combination comprising:
    a one-piece electrically conductive clip having a first, substantially planar section located substantially in a first plane and connected to a first end of a connecting section, and a second, substantially planar section connected to a second end of said connecting section and located substantially in a second plane spaced in a first direction from and substantially parallel to said first section;
    a first set of teeth located in said first section and extending outwardly from said first section only in a second direction substantially opposite from said a first direction; and
    a second tooth located in said second section and extending outwardly from said second section only in said second direction, said first planar section, connecting section and second planar section forming a conductive path between said the first set of teeth and the first electrically conductive member and said second tooth and the second electrically conductive member.

2. A bonding element according to claim 1, wherein each of said teeth in said first set of teeth is substantially tubular having a center axis extending substantially perpendicular to the plane of said first substantially planar section.

3. A bonding element according to claim 1, wherein said second tooth is substantially tubular with a center axis extending substantially perpendicular to the plane of said second substantially planar section.

4. A bonding element according to claim 1, wherein each of said teeth in said first set of teeth is substantially tubular, and
    said second tooth is substantially tubular.

5. A bonding element according to claim 1, wherein each of said teeth in said first set of teeth is substantially frustoconical and tapers upwardly and inwardly,
    said second tooth is substantially frustoconical and tapers upwardly and inwardly.

6. A bonding element according to claim 1, wherein each of said teeth in said first set of teeth extends outwardly from said first section at substantially right angles to said first section.

7. A bonding element according to claim 1, wherein said second tooth extends outwardly from said second section at substantially a right angle to said second section.

8. A bonding element according to claim 1, wherein said first section and second section are spaced apart a distance to receive the first electrically conductive member and where said first substantially planar section has a dimension and said first set of teeth are oriented to engage the second electrically conductive member.

9. A bonding element according to claim 1, wherein said clip is made of flexible metal material.

10. A bonding element according to claim 1, wherein said second tooth is aligned with one of said teeth in said first set of teeth.

11. The bonding element of claim 1, wherein said connecting section includes a first U-shaped connecting portion extending between said first substantially planar section and second substantially planar section, and a second U-shaped connecting portion extending between said first substantially planar section and said second substantially planar section.

12. The bonding element of claim 1, wherein said connecting section has a substantially U-shape, and where said second tooth extends only in said second direction.

13. The bonding element of claim 1, wherein said first set of teeth defines projections for making electrical contact with the first electrically conducting member, and said second tooth defines a projection for making electrical contact with the second electrically conducting member.

14. The bonding element of claim 1, wherein said first substantially planar section has a U-shape defining an elliptical opening, and said second substantially planar section has a U-shape defining an elliptical opening.

15. A bonding element to electrically connect first and second electrically conductive members, the combination comprising:
   a one-piece electrically conductive clip having a first, substantially planar section connected to a first end of a first connecting section and located substantially in a first plane and a second, substantially planar section connected to a second end of said first connecting section and located substantially in a second plane spaced in a first direction from and substantially parallel to said first section;
   a first set of teeth located in said first section and extending outwardly from said first section in a second direction substantially opposite from said first direction and oriented for contacting the first electrically conductive member; and
   a second tooth located in said second section and extending outwardly from said second section in said second direction and oriented for contacting the second electrically conducting member positioned between said first substantially planar section and said second substantially planar section,
   each of said teeth in said first set of teeth is substantially tubular with a center axis extending substantially perpendicular to a plane of said first substantially planar section and said second substantially planar section.

16. A bonding element according to claim 15, wherein said second tooth is substantially tubular with a center axis extending substantially perpendicular to a plane of said second substantially planar section.

17. A bonding element according to claim 15, wherein each of said teeth in said first set of teeth is substantially frustoconical with a center axis substantially perpendicular to a plane of said first substantially planar section and tapers upwardly and inwardly,
   said second tooth is substantially frustoconical with a center axis extending substantially perpendicular to a plane of said second substantially planar section and tapers upwardly and inwardly.

18. A bonding element according to claim 15, wherein said clip is made of flexible metal.

19. A bonding element according to claim 15, wherein said second tooth is aligned with one of said teeth in said first set of teeth.

20. The bonding element of claim 15, wherein said first substantially planar section is connected to a first end of a second connecting section.

21. The bonding element of claim 20, wherein a second end of said second connecting section is connected to said second substantially planar section.

22. The bonding element of claim 21, wherein said first connection section has a U-shape and said second connecting section has a U-shape.

23. A bonding washer for use with a first metal piece and a second metal piece, and a fastener for coupling said bonding washer to the first metal piece and the second metal piece, said bonding washer comprising:
   a substantially planar body having a first side edge and a second side edge;
   a first leg extending from said first side edge of said body in a first direction and having at least one first tooth extending in a second direction opposite said first direction; and
   a second leg extending from said second side edge of said body in said first direction substantially parallel to said first leg, said second leg having at least one second tooth extending in said second direction opposite said first direction.

24. The bonding washer of claim 23, wherein
   said at least one first tooth is spaced outwardly from said first leg and extends in a direction substantially parallel to a plane of said first leg, and
   said at least one second tooth is spaced outwardly from said second leg and extends in a direction substantially parallel to a plane of said second leg.

25. The bonding washer of claim 24, wherein
   said first leg has a distal end with a substantially U-shaped portion, and where said at least one first tooth extends from an end of said U-shaped portion; and
   said second leg has a distal end with a substantially U-shaped portion, and where said at least one second tooth extends from an end of said U-shaped portion.

* * * * *